United States Patent [19]
Yasunaga

[11] Patent Number: 5,938,361
[45] Date of Patent: Aug. 17, 1999

[54] WRITING UTENSIL AND METHOD OF MANUFACTURING THE WRITING UTENSIL

[75] Inventor: Masahiro Yasunaga, Osaka, Japan

[73] Assignee: Sakura Color Products Corp., Osaka-fu, Japan

[21] Appl. No.: 08/611,194

[22] Filed: Mar. 5, 1996

[30]     Foreign Application Priority Data

| Mar. 6, 1995 | [JP] | Japan | ................................. | 7-074600 |
| Jan. 8, 1996 | [JP] | Japan | ................................. | 8-018408 |

[51] Int. Cl.⁶ .............................. B43K 15/00; B43K 7/00
[52] U.S. Cl. ........................ 401/209; 401/251; 285/260
[58] Field of Search .................................. 401/209, 215, 401/251; 285/40, 260, 251

[56]             References Cited

U.S. PATENT DOCUMENTS

| 3,255,658 | 6/1966 | Gargrave . | |
| 3,255,795 | 6/1966 | Ginsburg . | |
| 3,408,092 | 10/1968 | Appleton | ............................ 285/251 X |
| 3,471,179 | 10/1969 | Sixt | .................................... 285/260 X |
| 3,797,865 | 3/1974 | Ballentine | .......................... 285/260 X |
| 4,755,075 | 7/1988 | Leem | ................................ 401/251 X |
| 4,770,560 | 9/1988 | Ott . | |

FOREIGN PATENT DOCUMENTS

| 123521 | 10/1984 | European Pat. Off. . | |
| 970015 | 12/1950 | France | ................................... 401/209 |
| 832720 | 7/1949 | Germany | ............................... 401/215 |
| 6451996 | 2/1989 | Japan . | |
| 1813964 | 5/1993 | Russian Federation | ................. 285/40 |
| 815049 | 6/1959 | United Kingdom . | |
| 2091365 | 7/1982 | United Kingdom | ................... 285/260 |
| 2098692 | 11/1982 | United Kingdom | ..................... 285/40 |
| 2145978 | 4/1985 | United Kingdom . | |
| 2244318 | 11/1991 | United Kingdom . | |

OTHER PUBLICATIONS

Patent Abstracts of Japan—Publ. No. 06179298 A.

*Primary Examiner*—Steven A. Bratlie
*Attorney, Agent, or Firm*—Wood, Phillips, VanSanten, Clark & Mortimer

[57]                ABSTRACT

A novel writing utensil in which an ink holder unit can be inserted into, and extracted from, a housing/main shaft. Helicoid screw threads are formed on the outer circumferential surface of a coupling portion of the ink holder unit or an inner circumferential surface of the main shaft. The main shaft or the outer circumferential surface of the ink holder unit without the screw threads is made of an elastic material for allowing the screw threads to bite thereinto. The coupling portion of the ink holder unit can be threaded into the main housing or pressed in a straight line thereinto. The ink holder unit can be extracted by relatively rotating the ink holder unit and main housing.

8 Claims, 9 Drawing Sheets

(a)

(b)

(a)

(b)

(c)

WRITING UTENSIL AND METHOD OF MANUFACTURING THE WRITING UTENSIL

BACKGROUND OF THE INVENTION

1. Field of the Invention

The present invention relates to a writing utensil such as a ball pen and, more particularly, to a writing utensil having an ink holder unit that can be readily inserted into and extracted from a cooperating housing/main shaft. The invention is also directed to a method of manufacturing such a writing utensil.

2. Background Art

A ball pen is known having an ink holder unit operatively held in a cylindrical housing/main shaft with a writing tip on the ink holder unit projecting from the main shaft and being held by a tip stopper secured to the main shaft. In such a conventional writing utensil, an external screw thread is formed on the main shaft to cooperate with an internal screw thread formed on the tip stopper. The main shaft is joined to the tip stopper by coupling the external screw thread of the main shaft and the internal screw thread of the tip stopper.

With the above structure, one can easily extract the ink holder unit, and thus, only the ink holder unit need be drawn out of the main shaft to replace it with a new one whenever the stored ink is exhausted. Since the main shaft can be repeatedly re-used, it is quite economical and preferred for business use. An invention on a ball pen of this kind is described in Japanese Patent Laid-Open Publication No. 51996/1989.

Nevertheless, coupling the external and internal threads of the ball pen having the above structure is quite troublesome, and thus, the above structure is not well suited for mass production.

The reason for coupling the external and internal screw threads is to prevent the ink holder unit from slipping out of the main shaft. There is also known a ball pen which prevents the ink holder unit from slipping out of the main shaft by way of fixing the main shaft and the tip stopper with an adhesive agent instead of coupling threads. Since the main shaft and the tip stopper are merely coated with an adhesive agent prior to a simple press fit step, this structure is well suited for mass production. An invention on a ball pen of this kind is described in Japanese Patent Laid-Open Publication No. 179298/1994.

Nevertheless, since this method of fixing the main shaft and the tip stopper with adhesive agent will not allow extraction of the ink holder unit, this method cannot be used with a ball pen to allow the ink holder unit to be replaced.

Thus, there has been a demand for such a writing utensil i.e. ball pen, having structure to allow replacement of only the ink holder unit without necessarily executing a screwing step as part of the assembly process.

SUMMARY OF THE INVENTION

Therefore, an object of the invention is to provide a novel writing utensil allowing easy extraction of an ink holder unit from a housing/main shaft and easy insertion of the ink holder unit into the main shaft in such a manner as to be firmly held thereby. The invention is also directed to a novel manufacturing method for this writing utensil.

To achieve the above object, the invention uses an ink holder unit integrating a tip stopper and a writing tip to which an ink supply is communicated from a receptacle for the ink. Either the ink holder unit or the main shaft is provided with helicoid screw threads.

According to the invention, assembly of the writing utensil can be effected by forcible insertion of the integrated ink holder unit into the main shaft through relative translational movement, and thus the inventive writing utensil can be assembled very easily and is well suited for mass production.

Since either the ink holder unit or the main shaft is provided with the helicoid screw threads that come into contact with the other component, there is good resistance to separation of the ink holder unit from the main shaft.

When replacing the used ink holder unit with a new one, the ink holder unit can be pulled straight out or rotated. Since either the ink holder unit or the main shaft is provided with helicoid screw threads, the used ink holder unit advances in the axial direction as the ink holder unit and main shaft are relatively rotated.

It is also possible to form a rib extending in the axial direction on either the ink holder unit or the main shaft so that the helicoid screw threads engage the rib. The rib can be formed in such a manner as to come into contact with the helicoid screw threads with a substantial pressure. As a consequence, the cooperating helicoid screw threads and rib develop a large force that resists slip-off of the ink holder unit. In addition, this arrangement facilitates smoother axial directional movement of the ink holder unit when being rotated.

The invention also contemplates providing either the ink holder unit or the main shaft with a polygonal surface in place of the aforementioned rib.

The inventive coupling structure is also useable for fixing a tail stopper of a writing utensil or for joining material components other than those in writing utensils.

When using the invention to bond a tail stopper of a writing utensil, helicoid threads are formed either on the external circumference of a male member or on the internal circumference of a female member to enable the helicoid threads to be engaged with the cooperating component.

DETAILED DESCRIPTION OF THE DRAWINGS

Figure 1:
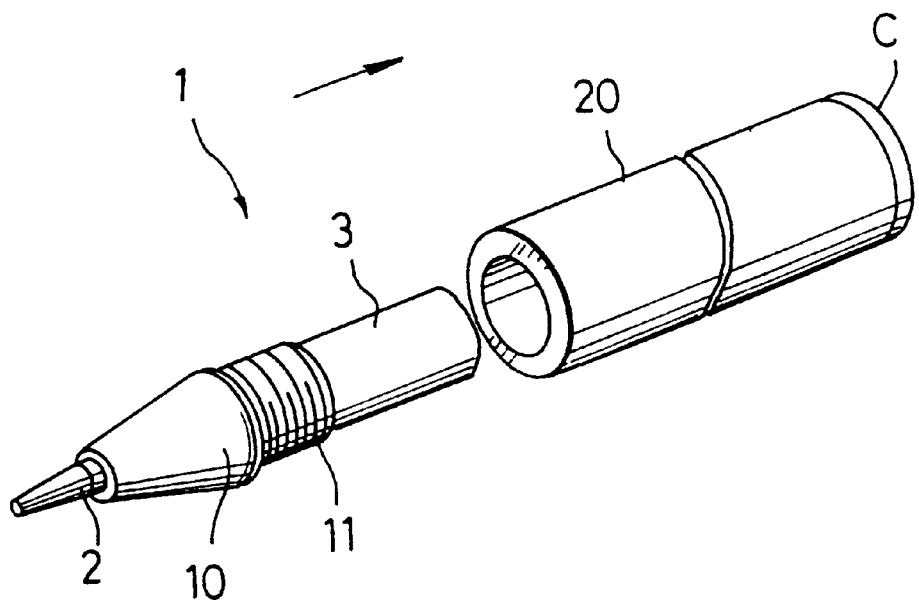
FIG. 1 is an exploded, perspective view of a ball pen according to a first embodiment of the invention.

The invention can be used with a ball pen as shown in FIG. 1. The ball pen shown in FIG. 1 has an elongate cylindrical housing/main shaft 20 and an ink holder unit 1 inserted therein. The ink holder unit 1, according to the invention, has a cylindrical receptacle 3 for a supply of ink, a tip stopper 10, and a ball pen tip 2. The ink receptacle 3 is a tube made from a plastic, such as polypropylene or polyethylene resin, in which conventional aqueous or oil ink (not illustrated) is stored.

The tip stopper 10 is made from polypropylene resin, polyethylene resin, polyester resin, or the like. Preferably, the tip stopper 10 is formed by injection molding of polyester resin having high hardness. The tip portion of the tip stopper 10 has a conical shape, whereas the rear portion has a cylindrical form. A helicoid screw thread 11 is formed in the middle on a coupling portion 12 of the tip stopper 10. A hole (not shown) for feeding ink is provided through the center of the tip stopper 10.

The ball pen tip 2 has a metallic ball holder and a rotatable ball inserted therein. The ink holder unit 1 includes the tip stopper 10, which is inserted in the tip end of the ink receptacle 3, and the ball pen tip 2 at the tip end of the tip stopper 10, which components are integrated together.

In this embodiment, the tip stopper 10 functions as a male member, whereas the main shaft 20 functions as a female member. The tip stopper 10 and the main shaft 20 can also be formed as shown in the second through ninth embodiments herein.

Figure 2:
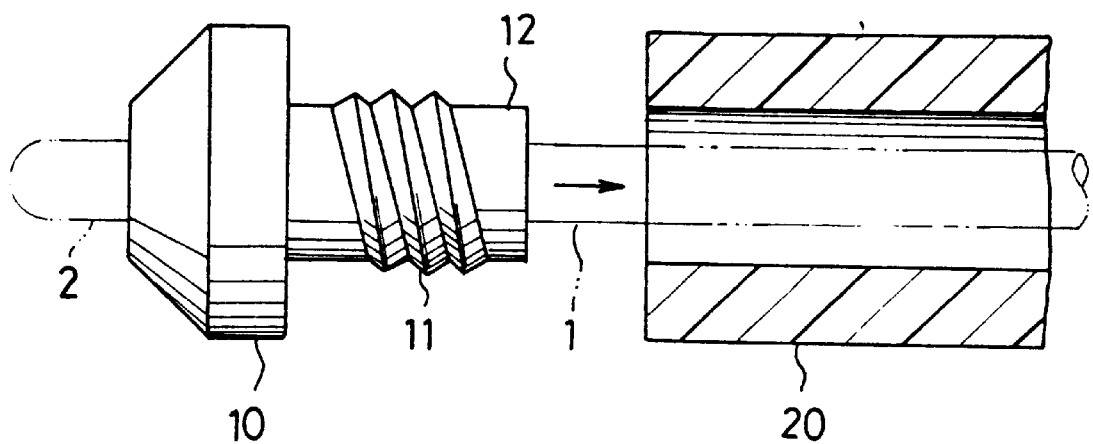
FIG. 2(a) is a partial cross-sectional view of the fundamental components of the ball pen according to the first embodiment of the invention showing an ink holder unit disengaged from a housing/main shaft.
FIG. 2(b) is a view as in FIG. 2(a) with the ink holder unit inserted in the main shaft.
Figure 2:
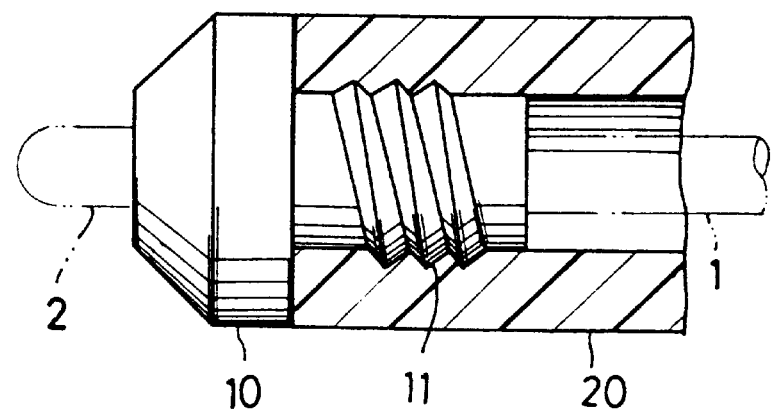

As shown in FIGS. 2(a) and 2(b), exemplifying the first embodiment of the invention, the helicoid screw thread 11 is formed on the external annular surface/circumference of the tip stopper 10, functioning as the male member. No screw thread is formed on the cooperating annular surface on the main shaft 20 functioning as the female member. The main shaft 20 is made from elastic material so that the helicoid screw thread 11 can bite thereinto. It is desired that the main shaft 20 be made from a material having a hardness less than the tip stopper 10. FIG. 2 shows the same embodiment as that shown in FIG. 1, in which the fundamental components are shown to be more easily described.

Figure 4:
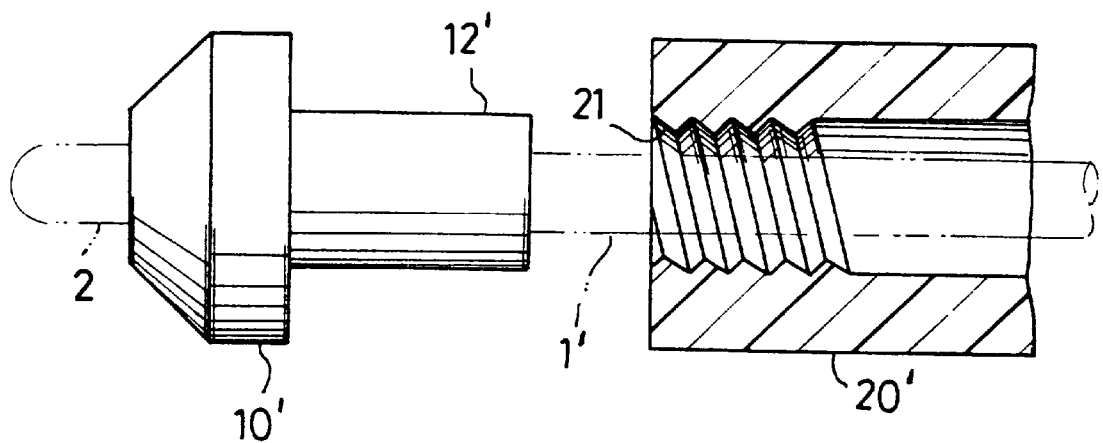
FIG. 4(a) is a partial cross-sectional view of the fundamental components of a ball pen according to the second embodiment of the invention showing the ink holder unit disengaged from the main shaft.
FIG. 4(b) is a view as in FIG. 4(a) with the ink holder unit inserted in the main shaft.
Figure 4:
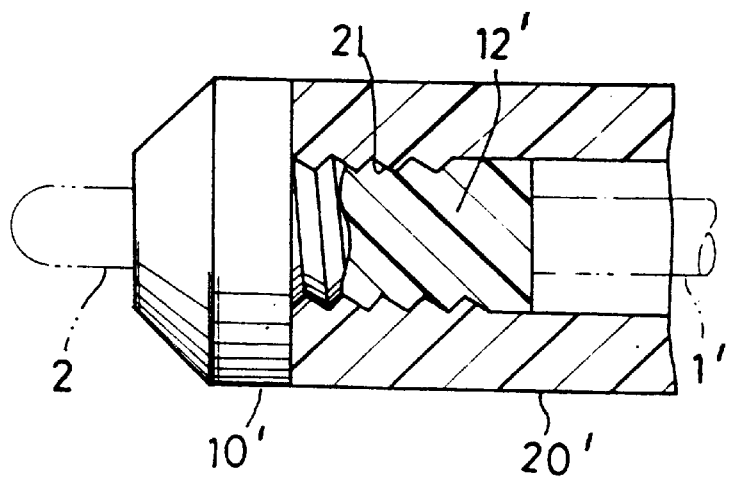

As shown in FIGS. 4(a) and 4(b), the second embodiment of the invention has helicoid screw threads 21 around an internal annular surface of an edge of the main shaft 20'. No screw threads are formed on the cooperating tip stopper 10'. The tip stopper 10' is made from elastic material so that the screw thread 21 can bite into the coupling portion 121.

The material used, according to the invention, is elastic but does not have to be highly deformable. It is enough to cause the elastic material to slightly recess at the moment at which the elastic material is tightly pressed by the tip portions of the screw threads 11, 21. Accordingly, when employing the invention with a ball pen, the main shaft of such a conventionally known ball pen can be re-used.

The coupling portion 12, 12' of the tip stopper 10, 10' may have a uniform diameter. However, it is also contemplated by the invention to slightly reduce the diameter of the edge of the coupling portion 12, 12', as shown in phantom in FIG. 4(a), to provide a tapered form so that the coupling portion 12, 12' can be easily inserted into the main shaft 20, 20'.

When the ink holder unit 1, 1' is inserted into the main shaft 20, 20' in operative relationship, as shown in FIG. 2(b) and FIG. 4(b), the portion 12, 12' of the tip stopper 10, 10' coupled with the interior of the main shaft 20, 20' in a state in which either the screw threads 11 of the tip stopper 10 or the screw threads 21 of the main shaft 20' bite into the inner, annular, circumferential surface of the main shaft 20 or the outer, annular, circumferential surface of the tip stopper 10'. FIG. 2(b) and FIG. 4(b) illustrate the state in which the screw threads 11 and 21 have fully bitten into the inner circumferential surface of the main shaft 20 or the outer circumferential surface of the tip stopper 10'. It is also contemplated to have a condition in which only the tip end of the screw threads 11 and 21 bites slightly into the cooperating circumferential, annular surface.

When using a ball pen in which only the tip portions of the screw threads 11 and 21 bite into the cooperating circumferential surface, a helicoid space is formed between the ink holder unit 1, 1' and inner surface of the main shaft 20, 20', which helicoid space functions as an air vent hole.

By causing the screw threads 11 of the tip stopper 10 or the screw threads 21 of the main shaft 20' to bite into the outer circumferential surface of the tip stopper 10 or the inner circumferential surface of the main shaft 20', the ink holder unit 1, 1' is prevented from easily slipping off of the main shaft 20, 20'. And yet, since the ink holder unit 1, 1' can be engaged with the interior of the main shaft 20, 20' merely by forcibly inserting the tip stopper 10 10' against the main shaft 20, 20' by relative translational movement, it is possible to quickly assemble a large amount of ball pens.

More specifically, assembly of ball pens according to the first embodiment of the invention is carried out by way of the following steps. First, the ink holder unit 1 and the main shaft 20 shown in FIG. 1 are pre-formed. The tip stopper 10 and the ball pen tip 2 are joined at the tip portion of the ink cylinder 3, to define the ink holder unit 1. Screw threads 11 are formed on the middle part thereof. Simultaneously, the cylindrical main shaft 20 is produced.

Next the ink holder unit 1 is forcibly inserted into the hollow main shaft 20. The ink holder unit 1 is inserted in a straight line into the main shaft 20 without causing the ink holder unit 1 and the main shaft 20 to rotate relative to each other. As a result, the screw threads 11 on the tip stopper 10 of the ink holder unit 1 are inserted in the main shaft 20 to cause the ink holder unit 1 to be secured to the main shaft 20 in an operative relationship.

Figure 3:
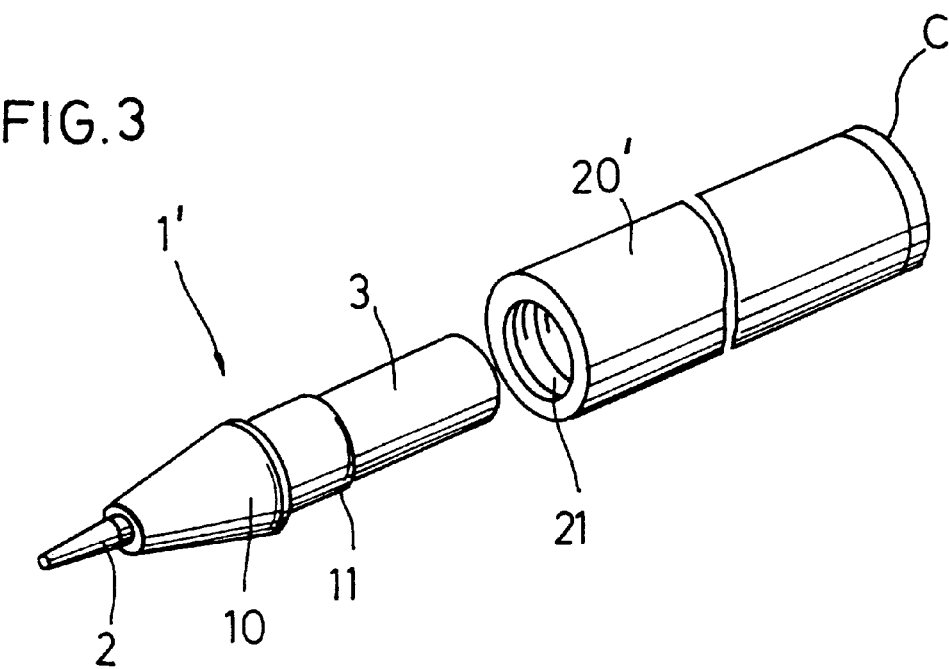
FIG. 3 is an exploded, perspective view of ball pen according to a second embodiment of the invention.

Steps for assembling the ball pen according to the second embodiment of the invention are described below. In the same way as was done for the first embodiment, the ink holder unit 1' and the main shaft 20' are pre-formed. However, as shown in FIG. 3, the screw threads 21 are formed only at the inner edge portion of the main shaft 20', whereas no screw threads are formed on the tip stopper 10'. Then, as was done with the prior embodiment, the ink holder unit 1' is forcibly inserted into the hollow main shaft 20'.

When replacing the empty ink holder unit 1, 1' after running out of ink, the user extracts the ink holder unit 1, 1' by rotating the tip stopper portion 10, 10' of the ink holder unit 1, 1' in the same manner as loosening of a screw. In this condition, the screw threads 11, 21 provided for the tip stopper 10 or the main shaft 20' still bite into the cooperating component member, thereby causing the other component member to have a provisional screw form. Accordingly, when the user rotates the tip stopper 10, 10', the ink holder unit 1, 1' proceeds in conjunction with the tip stopper 10 along the screw threads 11, 21 until the ink holder unit 1, 1' leaves the main shaft 20, 20'.

Since the user individually replaces the ink holder unit 1, 1', there is no need to quickly replace the ink holder unit 1, 1' on a mass basis. Furthermore, the tip stopper 10, 10' does not maintain engagement only through friction forces caused by forcible insertion thereof, but also maintains axial directional engagement through the biting of the screw threads. Thus, even if the user may incur some inconvenience in grasping the tip stopper 10, 10', he/she may simply exert a slight rotative force, thereby loosening the screw threads so that he/she can easily extract the tip stopper 10, 10' from the main shaft 20, 20'.

After extracting the tip stopper 10, 10', while a slight indentation may remain on the main shaft 20, 20' from the screw threads 11, 21, the substantial part of the inner circumferential surface of the main shaft 20 (according to the first embodiment) previously bitten by the screw threads 11 of the tip stopper 10, or outer circumferential surface of the tip stopper 10' (according to the second embodiment) previously bitten by the screw threads 21 of the main shaft 20', restores to a substantially undeformed state. By properly selecting component materials, the inner and outer circumferential surfaces may fully restore so that the cooperating annular surfaces thereof are free from substantially all deformation caused by the screw threads 11, 21.

If the replaced ink holder unit 1' causes an internal screw-shaped trace to remain on the inner surface of the main shaft 20', when replacing the empty ink holder unit 1' with a new one, the tip stopper 10' can be coupled with the main shaft 20' by rotating the new ink holder unit 1' after inserting it into the main shaft 20'.

The basic structure of, and method of using, the writing utensil according to the invention has thus been described by way of the first and second embodiments. Examples of variations of the invention are described below by way of third through ninth embodiments.

Figure 5:
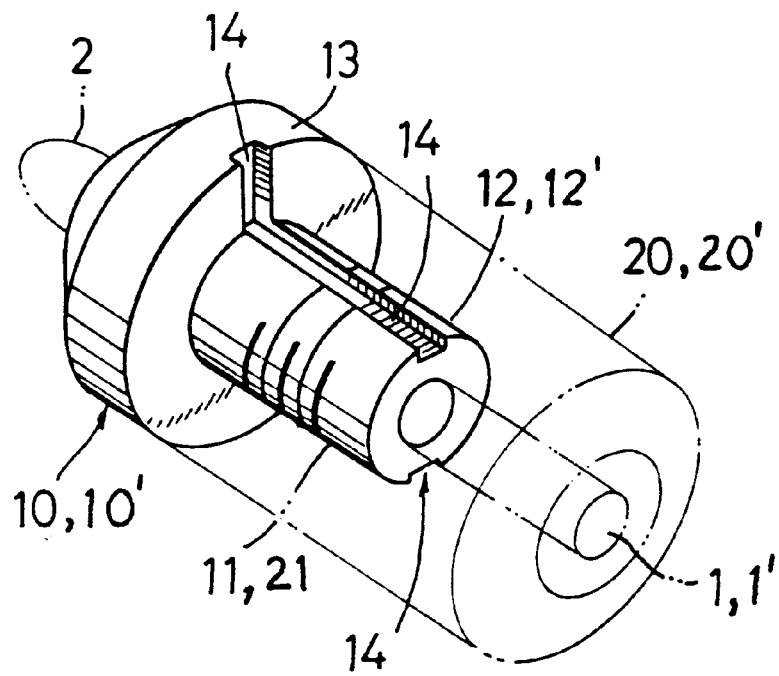
FIG. 5(a) is a perspective view of the fundamental components of a ball pen according to a third embodiment of the invention with a vent structure incorporated therein.
FIG. 5(b) is a view as in FIG. 5(a), showing a modified form of vent structure.
Figure 5:
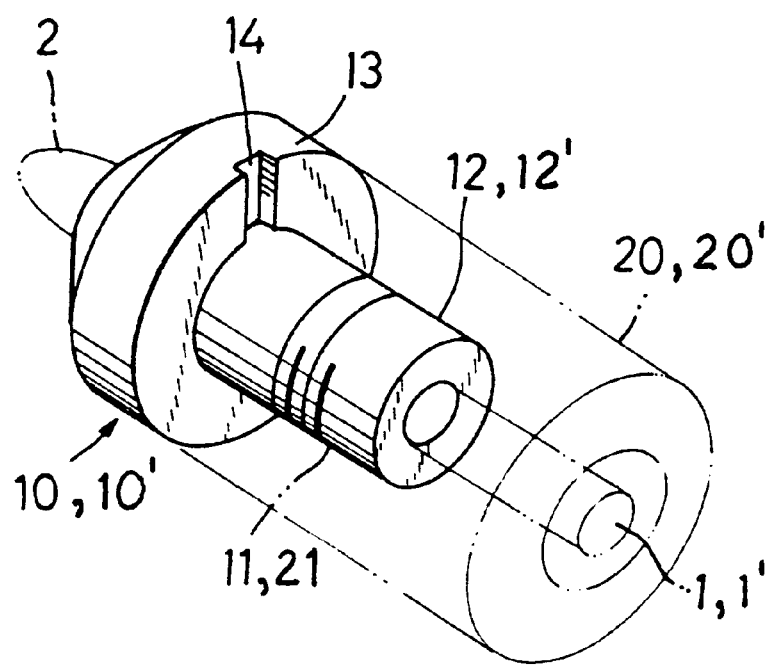

As shown in FIG. 5, the third embodiment has a cutout/air slit 14 running continuously lengthwise/axially along the surface of the coupling portion 12, 12' of the tip stopper 10, 10' and/or transversely through a radially enlarged portion 13 thereof This structure is specifically applicable to the case in which the invention is applied to ball pens.

In the structure of a ball pen, in order that ink stored in the ink holder unit 1, 1' can easily be discharged via the ball pen tip 2, it is essential that air be fed into the main shaft 20, 20'. Because of this need, pin holes may be formed in the main shaft 20, 20'. However, since pin holes adversely affect appearance, provision of pin holes is by no means desirable when considering design. To avoid this problem, there is prior art which forms pin holes in a tip stopper such as the tip stopper 10, 10' so that the pin holes can hardly be seen.

On the other hand, on the tip stopper 10, 10', the surface of the coupling portion 12, 12' and inner surface of the radially enlarged portion 13 are tightly adhered to the inner circumferential surface and tip edge surface of the main shaft 20, 20'. Thus, in order that clearance can be generated between the inner surface and edge surface of the main shaft 20, 20', the air slit 14 runs continuously lengthwise/axially across the surface of the coupling portion 12, 12' of the tip stopper 10, 10' and transversely/radially on the surface of the portion 13 so that air can be led into the hollow main shaft 20, 20' via the air slit 14, as per FIG. 5(*a*).

Generally, the space between the screw threads 11, 21 of the coupling portion 12, 12' and inner surface of the main shaft 20, 20' rarely becomes fully closed. Instead, a slight clearance is formed in the screw slit as shown in FIG. 5(*b*). The interior and exterior of the main shaft 20, 20' can be linked to each other merely by providing a cutout/air slit 14 only at the edge surface on the radially enlarged portion 13 of the tip stopper 10, 10'.

Figure 6:
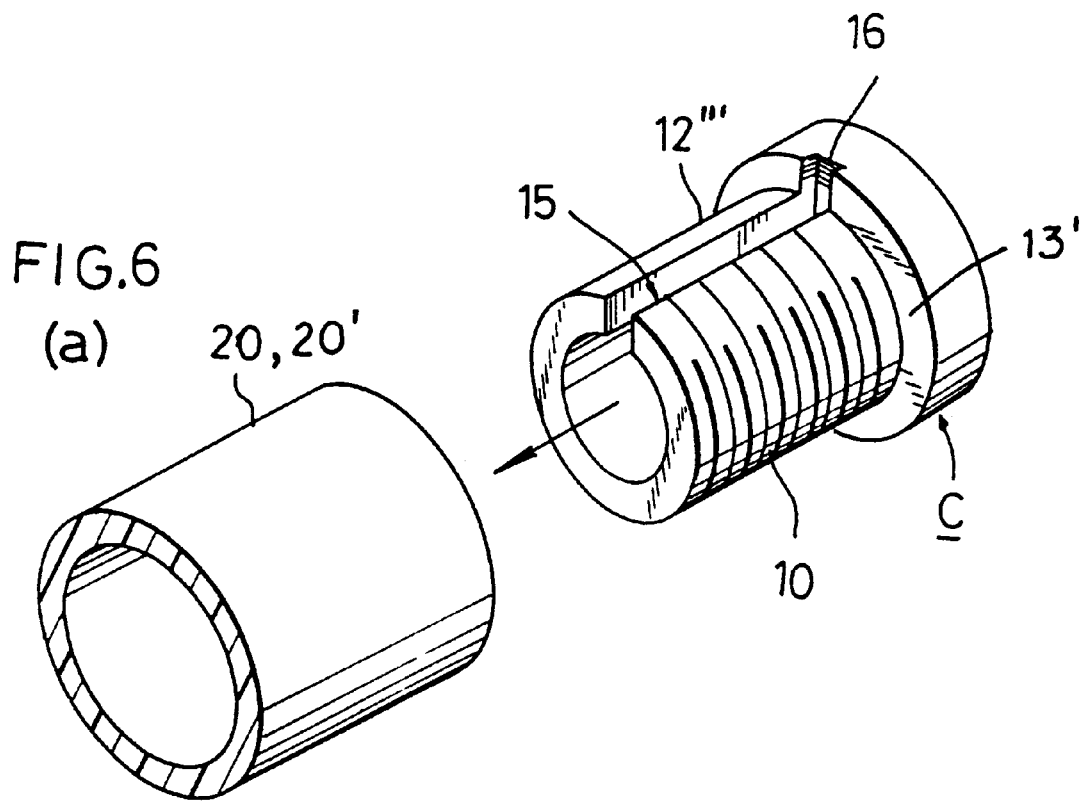
FIG. 6(a) is an exploded, perspective view of a connection between a tail stopper and main shaft in a fourth embodiment of the invention.
FIG. 6(b) is a view as in FIG. 6(a) with a modified form of connection.
Figure 6:
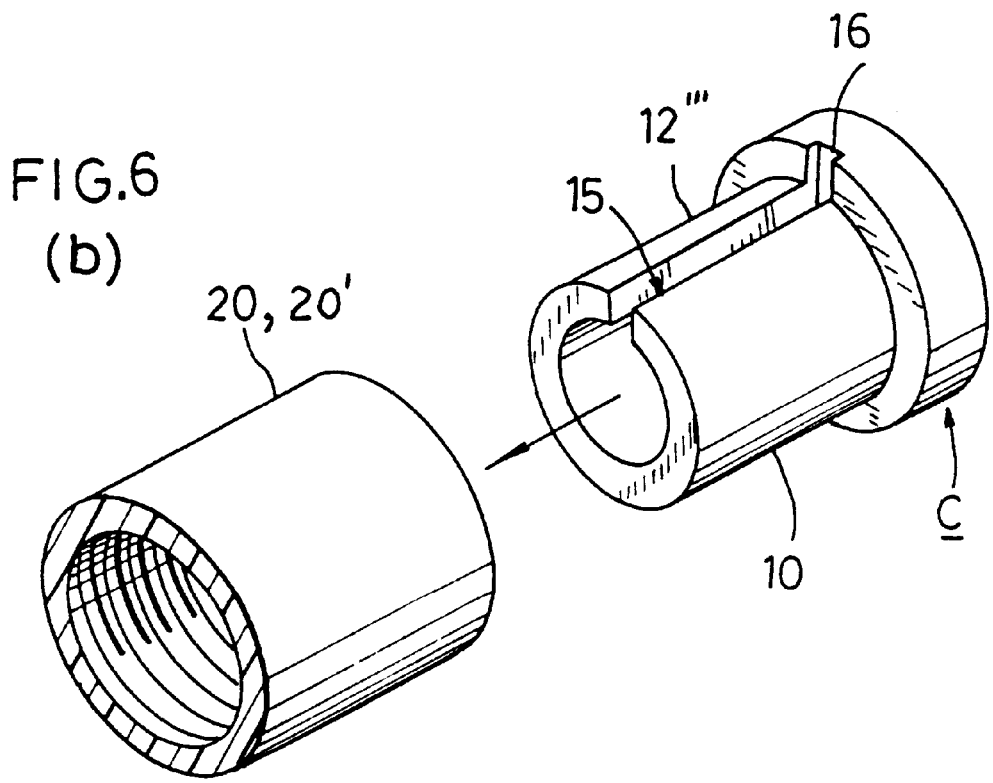

As shown in FIG. 6, the fourth embodiment has a tail stopper C with coupling structure identical to that used for the ink holder unit 1, 1' by way of forming a cutout 15 in a coupling portion 12''' of the tail stopper C. Since the ink holder unit 1, 1' is not secured to the tail stopper C, the cutout 15 can be formed. By providing the cutout portion 15, the diameter of the coupling portion 12''' can easily be contracted to facilitate easier insertion of the coupling portion 12''' into the main shaft 20, 20'. By virtue of the provision of a shallow slit 16 linking to the cutout portion 15 in a radially enlarged portion 13' of the tail stopper C, the cutout portion 15 and shallow slit 16 function as an air vent. As shown in FIG. 6(*a*) or FIG. 6(*b*), a screw thread is formed on either the coupling portion 12''' of the tailer stopper C or the main shaft 20, 20' so that screw threads can bite into the inner/annular, circumferential surface of the main shaft 20, 20' or the outer annular, circumferential surface of the coupling portion 12''' of the tail stopper C.

Figure 7:
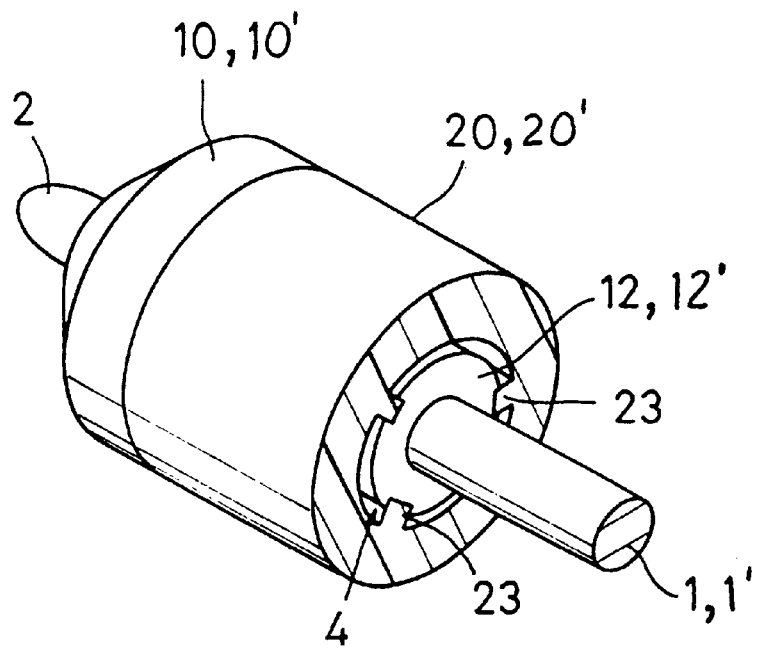
FIG. 7 is a perspective view of the fundamental components of a ball pen according to a fifth embodiment of the invention.

As shown in FIG. 7, the fifth embodiment provides an inner, annular circumferential surface of the main shaft 20, 20' with a plurality of projecting ribs 23 coming into contact with the outer, annular, circumferential surface of the tip stopper 10, 10'. The ribs 23 extend in the longitudinal/axial direction of the main shaft 20, 20' in order that they can bite slightly into the outer circumferential surface of the coupling portion 12, 12' of the tip stopper 10, 10'. The fifth embodiment also has screw threads on either the coupling portion 12, 12' of the tip stopper 10, 10' or the main shaft 20, 20'.

In the case of forming screw threads on the tip stopper 10, 10', the screw threads are continuously formed in the same way as was done for the preceding embodiments. On the other hand, when forming screw threads on the main shaft 20, 20', the screw threads are formed on the ribs 23, and thus the screw threads are not continuous.

In the fifth embodiment, the tip stopper 10, 10' comes into contact with the main shaft 20, 20' via the ribs 23. Accordingly, since the contact area between the tip stopper 10, 10' and the main shaft 20, 20' is less than that which it is when both members 10, 10' and 20, 20' are brought into contact over their entire circumferential, annular surfaces, frictional resistance is reduced therebetween to facilitate insertion of the coupling portion 12, 12' of the tip stopper 10, 10' into the main shaft 20, 20'.

When the coupling portion 12, 12' of the tip stopper 10, 10' is fully inserted into the main shaft 20, 20', the ribs 23 of the main shaft 20, 20' bite into the surface of the coupling portion 12, 12' of the tip stopper 10, 10'. The coupling portion 12, 12' of the tip stopper 10, 10' is gripped securely by the ribs 23 around its circumference to cause the tip stopper 10, 10' to be firmly held in the main shaft 20, 20'. However, since there is a reduced area of contact between the coupling portion 12, 12' of the tip stopper 10, 10' and the main shaft 20, 20', when the user rotates the tip stopper 10, 10' with a relatively small force, the tip stopper 10, 10' can be extracted from the main shaft 20, 20' quite easily.

Figure 8:
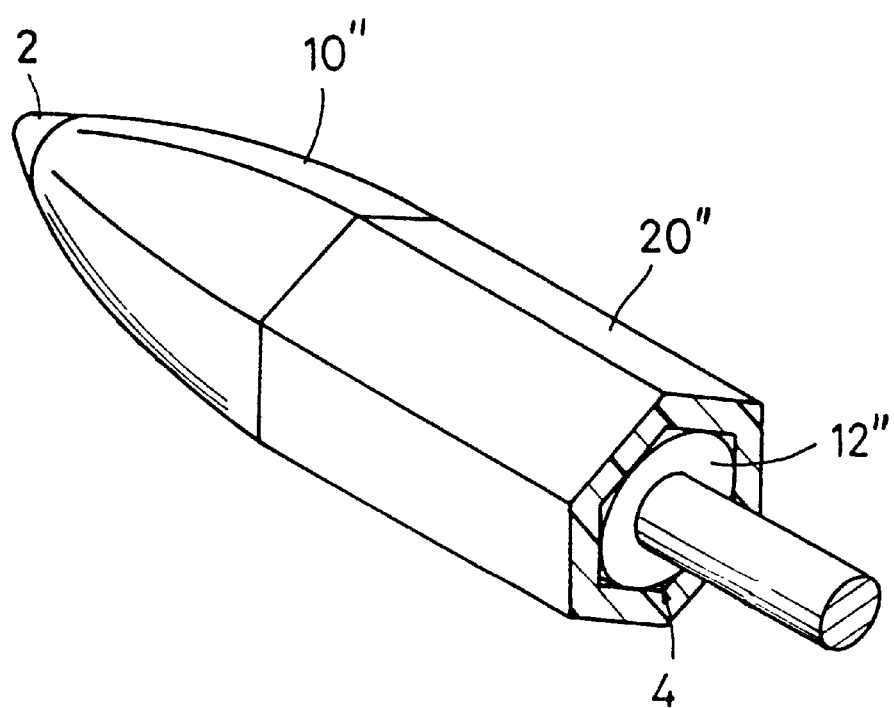
FIG. 8 is a perspective view of the fundamental components of a ball pen according to a sixth embodiment of the invention.

The sixth and seventh embodiments are also described as ball pens, in which the main shaft 20", 20'" is formed as a polygonal, cylindrical structure. More specifically, in the sixth embodiment, the main shaft 20" has a hexagonal, cylindrical form as shown in FIG. 8. The main shaft 20'" of the seventh embodiment in FIG. 9 has a triangular, cylindrical form. The sixth and seventh embodiments also have screw threads on the coupling portion 12", 12'" of the tip stopper 10", 10'" or the main shaft 20", 20'".

Figure 9:
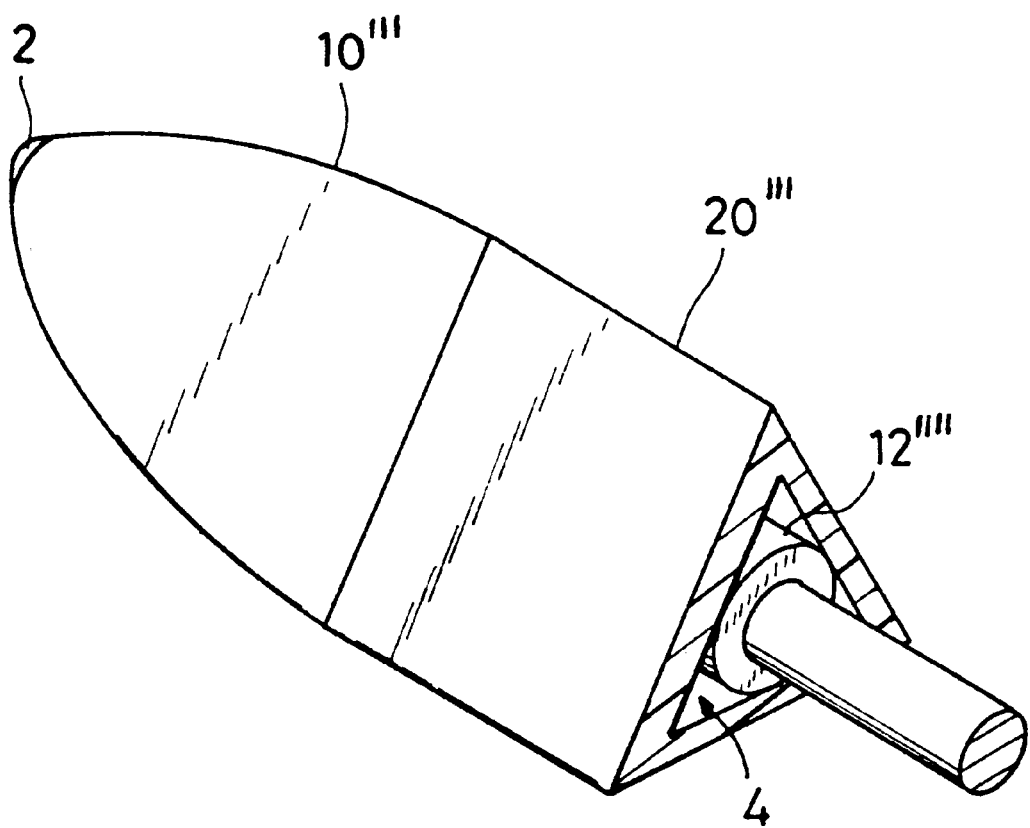
FIG. 9 is a perspective view of the fundamental components of a ball pen according to a seventh embodiment of the invention.

By virtue of the main shaft 20", 20'" having a polygonal outer circumferential surface, novelty of design can be generated. If the inner circumferential surface of the main shaft 20", 20'" is of a circular form in close contact with the outer circumferential surface of the coupling portion 12", 12'" of the tip stopper 10", 10'", it results in the same structure as that in the first and second embodiments, described above. However, as shown in FIG. 8 and FIG. 9 by reason of the main shaft 20", 20'" having hexagonal or triangular inner circumferential surfaces, the main shaft 20", 20'" comes into contact with the coupling portion 12", 12'" of the tip stopper 10", 10'" via tangents. Accordingly, it results in a diminished frictional resistance between the main shaft 20", 20'" and the coupling portion 12", 12'" of the tip stopper 10", 10'" to facilitate easier insertion of the tip stopper 10", 10'" into the main shaft 20", 20'". When the user rotates the tip stopper 10", 10'" with a relatively small force, the tip stopper 10", 10'" can be extracted from the main shaft 20", 20'" quite easily.

The above-described fifth and sixth embodiments (and that in FIG. 7) form a space 4 between the inner circumferential surface of the main shaft 20", 20'" and outer circumferential surface of the tip stopper 10", 10'". Thus, as described in the third embodiment herein, by forming a slit (not illustrated in FIGS. 8 and 9) in the inner surface of a radially enlarged portion of the tip stopper 10", 10'", the space 4 can serve as an air vent.

Figure 10:
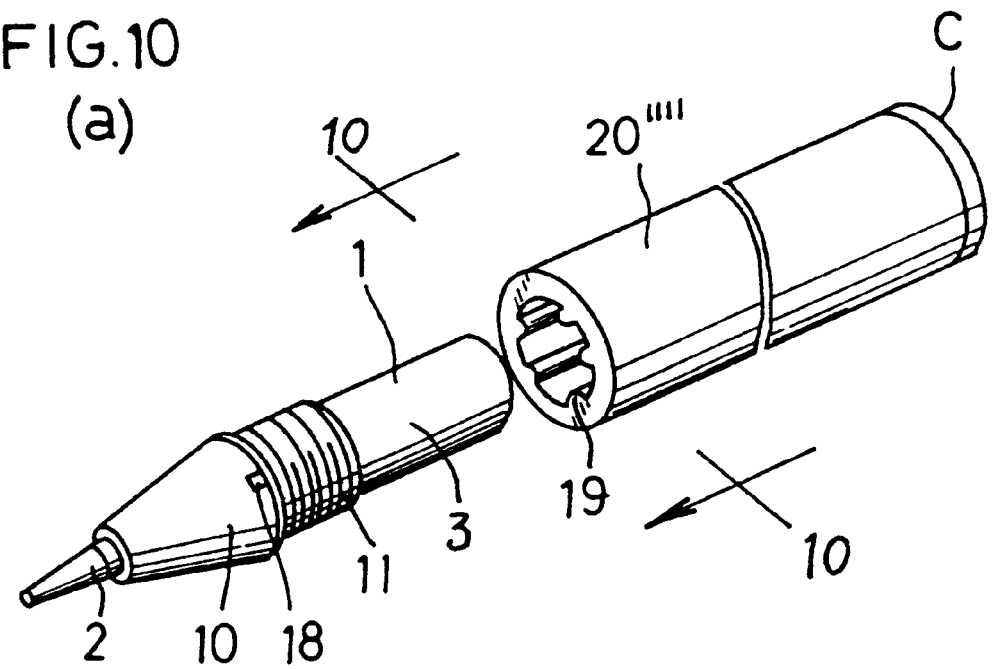
FIG. 10(a) is an exploded, perspective view of a ball pen according to an eighth embodiment of the invention.
FIG. 10(b) is a side elevation view of the front of the ball pen shown in FIG. 10(a)
FIG. 10(c) is a cross-sectional view of the main shaft of the ball pen taken along line 10—10 of FIG. 10(a)
Figure 10:
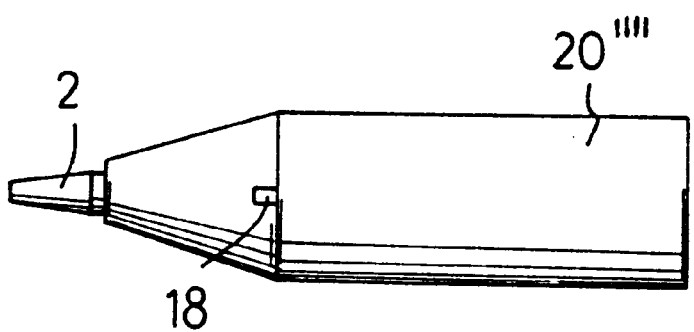
Figure 10:
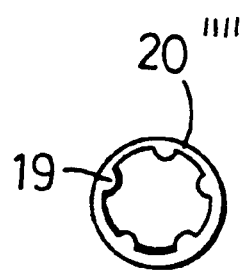

The eighth embodiment shows an example of a more complete venting between the interior and the exterior of the main shaft 20"". A shown in FIG. 10, the ball pen of the eighth embodiment uses the ink holder unit 1 having the form substantially identical to that used for the first embodiment. More specifically, the ink holder unit 1 has an ink receptacle 3, a tip stopper 10, and a ball pen tip 2. The front edge portion of the tip stopper 10 has a conical shape, whereas the rear edge portion has a cylindrical form. A helicoid screw thread 11 is formed in the middle portion of the ink holder unit 1.

The tip stopper 10 of the eighth embodiment differs from the tip stopper 10 in the first embodiment in that a cutout portion 18 is formed at a front end stepped portion, and more specifically on the threaded end of the conical front portion. The cutout portion 18 extends from the outer surface portion of the tip stopper 10 to the height of the screw threads 11.

A plurality of ribs 19 are formed on the inner surface at the front edge portion of the main shaft 20"". The eighth embodiment provides five equiangularly disposed ribs 19. Each rib 19 is as low as 0.3 mm in height and has an arcuate cross section.

The ball pen of the eighth embodiment is assembled in the same manner as are the preceding embodiments. More specifically, after forming the ink holder unit 1 and the main shaft 20"", the ink holder unit 1 is forcibly inserted into the main shaft 20"". The screw threads 11 of the tip stopper 10 are thrust into the edge portion of the main shaft 20"" in a straight line. As a result, the screw threads 11 bite into the ribs 19 to cause the ink holder unit 1 to be engaged with the main shaft 20"".

The cutout portion 18 extends from the outer surface of the tip stopper 10 up to the height of the screw threads 11. A plurality of ribs 19 are disposed around the front edge of the main shaft 20"" that contacts the screw threads 11. A space is formed between the main shaft 20"" and the tip stopper 10. Furthermore, although the screw threads 11 bite into the inner surface of the main shaft 20"", there is a slight clearance between the bottom of the screw threads and the inner surface of the main shaft 20"".

Accordingly, the eighth embodiment interlinks the interior and the exterior of the main shaft 20"" through the cutout portion 18 extending from the outer surface of the tip stopper 10 to either the clearance between the ribs 19 or through the screw threads 11.

Figure 11:
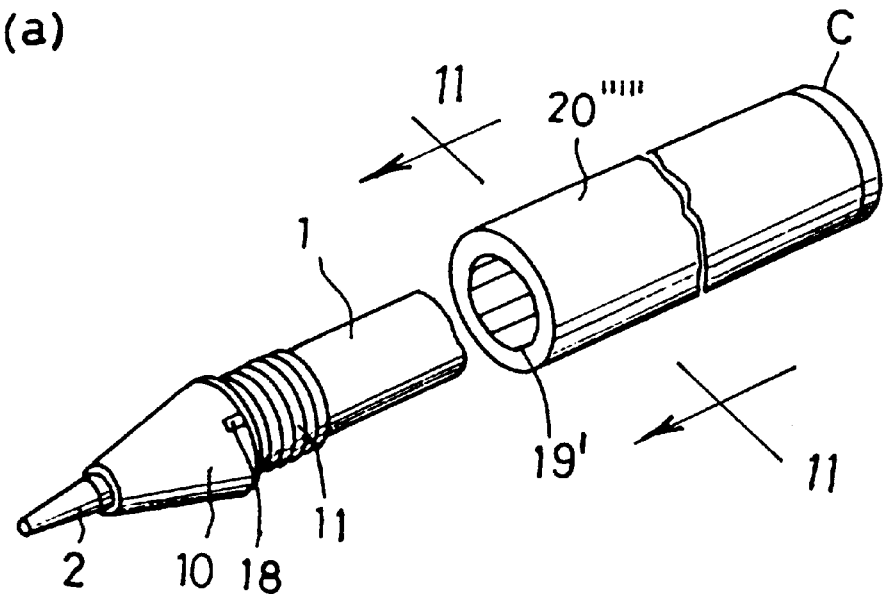
FIG. 11(a) is an exploded perspective view of a ball pen according to a ninth embodiment of the invention.
FIG. 11(b) is a side elevation view of the front of the ball pen shown in FIG. 11(a)
FIG. 11(c) is an enlarged, cross-sectional view of the main shaft of the ball pen taken along line 11—11 of FIG. 11(a).
Figure 11:
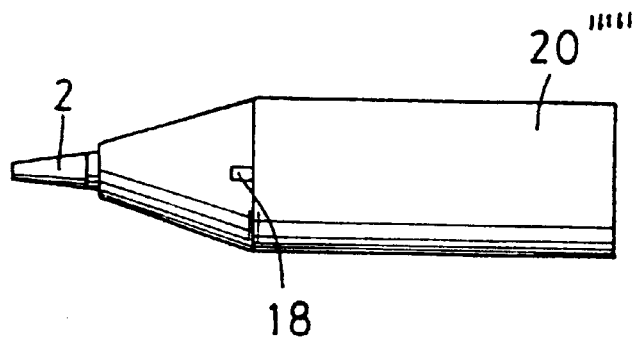
Figure 11:
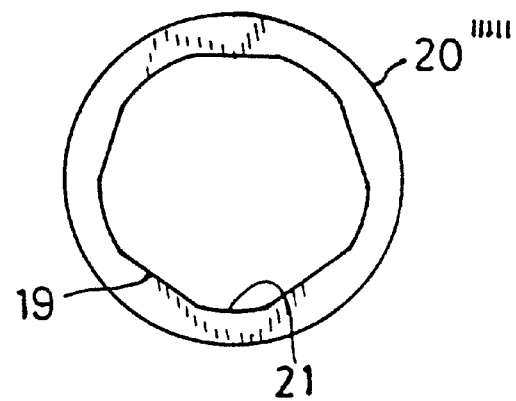

The ninth embodiment shown in FIG. 11 shows a variation of the ribs of the eighth embodiment. More specifically, the ninth embodiment provides ribs 19' having five flat peak portions joined by circular arcs. In this embodiment, the flat peaks and arcuately-shaped portions 21 are alternatingly arranged to thereby define a pentagonal shape with rounded corners.

If the circular arcuately-shaped portions 21 have a 6 mm diameter, approximately a 5.6 mm diameter circle will inscribe the flat pentagonal portions.

In the ninth embodiment, when the ink holder unit 1 is inserted into the main shaft 20"", the screw threads 11 of the tip stopper 10 bite into a part of the pentagonal portion.

The interior and the exterior of the main shaft 20"" are interlinked through the cutout portion 18 extending from the outer surface of the tip stopper 10 to either the clearance between the ribs 19' or through the screw threads 11.

The invention has thus been described by specifically referring to ball pens only as an example of a writing utensil into which the invention can be incorporated. It should be understood that the invention is also applicable to a writing utensil incorporating a writing tip other than a ball, such as ones using a plastic tip or a felt tip.

The coupling structure of the invention is also applicable to the coupling of a tip stopper and a main shaft of a ball pen consisting of a separately formed tip stopper and ink holder unit as in the prior art, discussed above. In addition, the novel coupling structure of the invention is effectively applicable not only to an extensive range of writing utensils, but also to all kinds of products in which male members are engageable with female members.

More specifically, use of male and female members is not merely confined to the tip stopper or the main shaft of a ball pen, but can also be used, for example, between a cap and tube unit of a painting utensil.

Because of the high versatility in processing the helicoid form, use of the screw shape is recommended for the above embodiments. It is also permissible to introduce any form of helicoid thread, such as a drill form, a core structure of an extruding machine, a discontinuous projected line, or recessed slit.

According to the invention, writing utensils can be assembled by way of thrusting an ink holder unit into a main shaft through a translational movement. The invention lends itself to the mass production of writing utensils.

Since the male and female members can be engaged with other through a helicoid thread, the male member cannot easily be disengaged from the corresponding female member, thus resulting in enhanced reliability and product quality.

When replacing the exhausted ink holder unit with a new one, the user can easily extract the used one from the main shaft merely by rotating it.

The foregoing disclosure of specific embodiments is intended to be illustrative of the broad concepts comprehended by the invention.

I claim:

1. A writing utensil comprising:

an ink holder unit having a first annular surface; and a main shaft having a second annular surface, one of the first and second annular surfaces having helicoidal threads formed thereon, the other of the first and second annular surfaces comprising an elastic material and having no threads pre-formed thereon, the first and second annular surfaces residing one within the other with the ink holder unit and the main shaft in operative relationship, the first and second annular surfaces being relatively dimensioned so that the ink holder unit and the main shaft can be placed into operative relationship by translational movement and so that the helicoidal threads bite into the other of the first and second annular surfaces with the ink holder unit and the main shaft in the operative relationship.

2. The writing utensil according to claim 1 wherein the writing utensil has a tip end and a tail end, the ink holder unit comprises a tip stopper, a writing tip and a receptacle for a supply of ink to be communicated to the writing tip and the main shaft has a hollow portion into which the ink receptacle extends with the ink holder unit and main shaft in the operative relationship.

3. The writing utensil according to claim 2 wherein the writing utensil is a ball pen.

4. The writing utensil according to claim 2 wherein the helical threads are on the tip stopper.

5. The writing utensil according to claim 1 wherein the elastic material of the one of the first and second annular surfaces is harder than the elastic material of the other of the first and second annular surfaces.

6. The writing utensil according to claim 1 wherein the elastic material of the one of the first and second annular surfaces comprises plastic.

7. The writing utensil according to claim 1 wherein the elastic material of the one of the first and second annular surfaces comprises at least one of polypropylene resin, polyethylene resin, and polyester resin.

8. A method of manufacturing a writing utensil, said method comprising the steps of:

providing an ink holder unit comprising a tip stopper with a writing tip and a first annular surface;

providing a main shaft with a second annular surface, there being helical threads on one of the first and second annular surfaces and no threads pre-formed on the other of the first and second annular surfaces; and directing the ink holder unit and main shaft, one against the other by translatory movement into an operative relationship wherein the first and second annular surfaces reside one within the other with the helicoid threads against the other of the first and second annular surface.

* * * * *